United States Patent
Lee et al.

(10) Patent No.: US 11,099,981 B2
(45) Date of Patent: Aug. 24, 2021

(54) MEMORY SYSTEM AND OPERATING METHOD THEREOF

(71) Applicant: SK hynix Inc., Gyeonggi-do (KR)

(72) Inventors: Jong-Min Lee, Seoul (KR); Hyeong-Ju Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/210,717

(22) Filed: Dec. 5, 2018

(65) Prior Publication Data
US 2019/0347197 A1 Nov. 14, 2019

(30) Foreign Application Priority Data

May 8, 2018 (KR) .................... 10-2018-0052523

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/0652* (2013.01); *G06F 3/0659* (2013.01); *G06F 3/0679* (2013.01); *G06F 2212/7205* (2013.01)

(58) Field of Classification Search
CPC .. G06F 12/0253; G06F 12/0261; G06F 3/061; G06F 3/0652; G06F 3/0659; G06F 3/0679; G06F 2212/7205
See application file for complete search history.

(56) References Cited

U.S. PATENT DOCUMENTS

| 8,250,316 | B2 * | 8/2012 | Bates | G06F 3/0613 |
| | | | | 711/154 |
| 2014/0089584 | A1 * | 3/2014 | Pan | G06F 12/08 |
| | | | | 711/118 |
| 2015/0134887 | A1 * | 5/2015 | Liang | G06F 12/0246 |
| | | | | 711/103 |
| 2017/0277436 | A1 * | 9/2017 | Huang | G06F 3/0679 |
| 2018/0232314 | A1 * | 8/2018 | Lin | G06F 3/06 |

FOREIGN PATENT DOCUMENTS

| KR | 1020120125950 | 11/2012 |
| KR | 10-2019-0099879 | 8/2019 |
| KR | 10-2019-0113107 | 10/2019 |
| KR | 10-2019-0117117 | 10/2019 |
| KR | 10-2019-0120573 | 10/2019 |

* cited by examiner

*Primary Examiner* — Masud K Khan
(74) *Attorney, Agent, or Firm* — IP & T Group LLP

(57) ABSTRACT

An operating method of a memory system includes determining whether a write command currently provided is a sequential write command or a random write command, performing a garbage collection operation based on whether a total capacity of data provided after a preceding garbage collection operation exceeds a sequential command threshold value, when it is determined that the write command is a sequential write command, and performing the garbage collection operation based on whether a number of sequential write commands among a set number of commands currently provided, is greater than or equal to a predetermined number and whether the total capacity of the data provided after the preceding garbage collection operation exceeds the sequential command threshold value, when it is determined that the write command is a random write command.

12 Claims, 14 Drawing Sheets

MEMORY SYSTEM AND OPERATING METHOD THEREOF

CROSS-REFERENCE TO RELATED APPLICATION

The present application claims priority under 35 U.S.C. § 119(a) to Korean Patent Application No. 10-2018-0052523, filed on May 8, 2018, the disclosure of which is incorporated herein by reference in its entirety.

BACKGROUND

1. Field

Embodiments of the present invention generally relate to a memory system. Particularly, the embodiments relate to a memory system capable of processing data by using a memory device, and an operating method of the memory system.

2. Description of the Related Art

The emerging computer environment paradigm is ubiquitous computing, that is, computing systems that can be used anytime and anywhere. As a result, use of portable electronic devices such as mobile phones, digital cameras, and notebook computers has rapidly increased. These portable electronic devices generally use a memory system having one or more memory devices for storing data. A memory system in such an electronic device may be used as a main memory device or an auxiliary memory device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments of the present invention are directed to a memory system and a method capable of determining continuity of commands.

In accordance with an embodiment of the present invention, an operating method of a memory system includes: determining whether a write command currently provided is a sequential write command or a random write command; performing a garbage collection operation based on whether a total capacity of data provided after a preceding garbage collection operation exceeds a sequential command threshold value, when it is determined that the write command is a sequential write command; and performing the garbage collection operation based on whether a number of sequential write commands, among a set number of commands currently provided, is greater than or equal to a predetermined number and whether the total capacity of the data provided after the preceding garbage collection operation exceeds the sequential command threshold value, when it is determined that the write command is a random write command.

In accordance with an embodiment of the present invention, a memory system includes: a memory device suitable for storing data; and a controller suitable for controlling the memory device, wherein the controller determines whether a write command currently provided is a sequential write command or a random write command, performs a garbage collection operation based on whether a total capacity of data provided after a preceding garbage collection operation exceeds a sequential command threshold value when the write command is a sequential write command, and performs the garbage collection operation based on whether a number of sequential write commands, among a set number of commands currently provided, is greater than or equal to a predetermined number and whether the total capacity of the data provided after the preceding garbage collection operation exceeds the sequential command threshold value when the write command is a random write command.

In accordance with an embodiment of the present invention, an operating method of a memory system includes: determining whether a write command currently provided is a sequential write command or a random write command; performing a garbage collection operation based on whether a total number of commands provided after a preceding garbage collection operation exceeds a sequential command threshold value, when it is determined that the write command is a sequential write command; and performing the garbage collection operation based on whether a number of sequential write commands among a set number of commands currently provided, is greater than or equal to a predetermined number and whether a total number of commands provided after the preceding garbage collection operation exceeds the sequential command threshold value, when it is determined that the write command is a random write command.

In accordance with an embodiment of the present invention, a memory system includes: a memory device suitable for storing data; and a controller suitable for controlling the memory device, wherein the controller determines whether a write command provided currently is a sequential write command, performs a garbage collection operation based on whether or not a total number of commands provided after a preceding garbage collection operation exceeds a sequential command threshold value when the write command is a sequential write command, and performs the garbage collection operation based on whether the total number of commands exceeds the sequential command threshold value when the write command is a random write command and a number of sequential write commands, greater than or equal to a set number among a plurality of commands currently provided are received.

In accordance with an embodiment of the present invention, a memory system includes: a memory device suitable for storing data; and a controller suitable for controlling the memory device, wherein the controller receives a write command, determines whether the write command is a sequential write command or a random write command, and performs a garbage collection operation based on the determined type of the write command, whether a number of sequential write commands among a set number of commands received exceeds an allowable number, and an amount of written data stored in the memory device.

DETAILED DESCRIPTION

Figure 1:
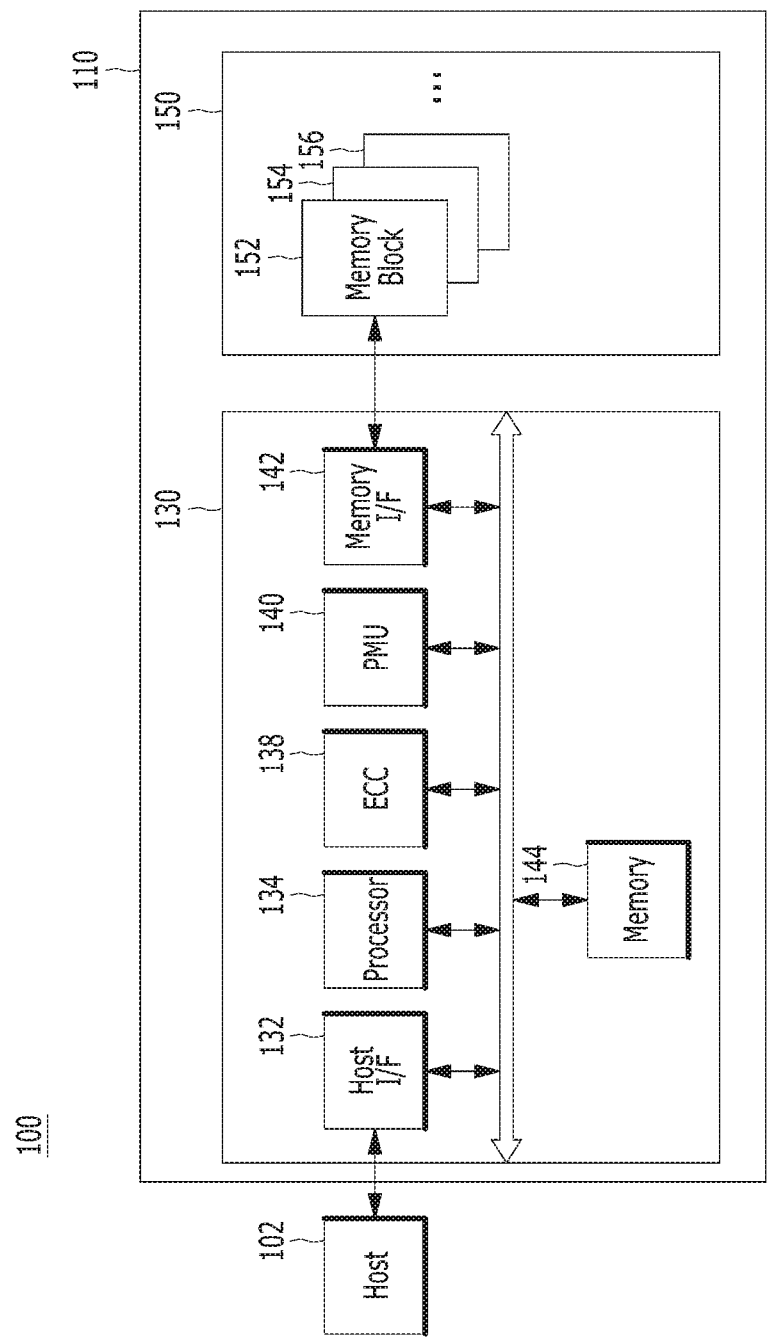
FIG. 1 is a block diagram illustrating a data processing system in accordance with an embodiment of the present invention.

Various embodiments of the present invention are described below in more detail with reference to the accompanying drawings. However, elements and features of the present disclosure may be configured or arranged differently than disclosed herein. Thus, the present invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. It is noted that reference to "an embodiment," "another embodiment", and the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected or coupled, may be wired or wireless, unless stated or the context indicates otherwise.

In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, an MP3 player and a laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. The OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. The mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), reduced size MMC (RS-MMC) and micro-MMC. The SD card may include a mini-SD card and micro-SD card.

The memory system 110 may be implemented by various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems exemplified above. For example, the controller 130 and the memory device 150 may be so integrated to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card such as a personal computer memory card international association (PCMCIA) card, a compact flash (CF) card, a smart media card (SMC), a memory stick, a multimedia card (MMC) including a reduced size MMC (RS-MMC) and a micro-MMC, a secure digital (SD) card including mini-SD, micro-SD and SD High Capacity (SDHC), or a universal flash storage (UFS) device.

Non-limiting application examples of the memory system 110 include a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game machine, a navigation system, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains stored data stored even though power is not supplied. The memory device 150 may store data provided from the host 102 through a write operation, and provide data stored therein to the host 102 through a read operation. The memory device 150 may include a plurality of memory blocks 152, 154, 156, each of which may include a plurality of pages. Each of the pages may include a plurality of memory cells coupled to a word line. In an embodiment, the memory device 150 may be a flash memory. The flash memory may have a 3-dimensional (3D) stack structure.

Since the structure of the memory device 150 including a 3D stack structure embodiment will be described in detail later with reference to FIGS. 2 to 4, further description of that aspect is omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a power management unit (PMU) 140, a memory interface (I/F) 142 (or a NAND flash controller (NFC)), and a memory 144, all operatively coupled via an internal bus.

The host interface 132 may be configured to process a command and data of the host 102. The host interface 132 may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC component 138 may detect and correct an error contained in the data read from the memory device 150. In other words, the ECC component 138 may perform an error correction decoding process on the data read from the memory device 150 through an ECC code used during an ECC encoding process. According to a result of the error correction decoding process, the ECC component 138 may output a signal, for example, an error correction success/fail signal. When the number of error bits is greater than a threshold value of correctable error bits, the ECC component 138 may not correct the error bits, and instead may output an error correction fail signal.

The ECC component 138 may perform error correction through a coded modulation such as a low density parity check (LDPC) code, a Bose-Chaudhri-Hocquenghem (BCH) code, a turbo code, a Reed-Solomon (RS) code, a convolution code, a recursive systematic code (RSC), a trellis-coded modulation (TCM) and a block coded modulation (BCM). However, the ECC component 138 is not limited to any specific structure. The ECC component 138 may include any and all circuits, modules, systems or devices for suitable error correction.

The PMU 140 may provide and manage power of the controller 130.

The memory I/F 142 may serve as a memory/storage interface for interfacing the controller 130 and the memory device 150 such that the controller 130 controls the memory device 150 in response to a request from the host 102. When the memory device 150 is a flash memory (specifically a NAND flash memory), the memory I/F 142 may generate a control signal for the memory device 150 and process data to be provided to the memory device 150 under the control of the processor 134. The memory I/F 142 may work as a NAND flash interface for processing a command and data between the controller 130 and the memory device 150. Specifically, the memory I/F 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 shows the memory 144 disposed within the controller 130, but this is merely an example. In an embodiment, the memory 144 may be an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL). The processor 134 may be implemented as a microprocessor or a central processing unit (CPU).

For example, the controller 130 may perform an operation requested by the host 102 in the memory device 150 through the processor 134, which is implemented as a microprocessor or a CPU. In other words, the controller 130 may perform a command operation corresponding to a command received from the host 102, or other source. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

The controller 130 may perform a background operation onto the memory device 150 through the processor 134, which is implemented as a microprocessor or a CPU. The background operation performed onto the memory device 150 may include an operation of copying and processing data stored in some memory blocks among the memory blocks 152 to 156 of the memory device 150 into other memory blocks, e.g., a garbage collection (GC) operation, an operation of swapping between the memory blocks 152 to 156 or between the data of such memory blocks, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156.

A memory device of the memory system in accordance with an embodiment of the present invention is described in detail with reference to FIGS. 2 to 4.

Figure 2:
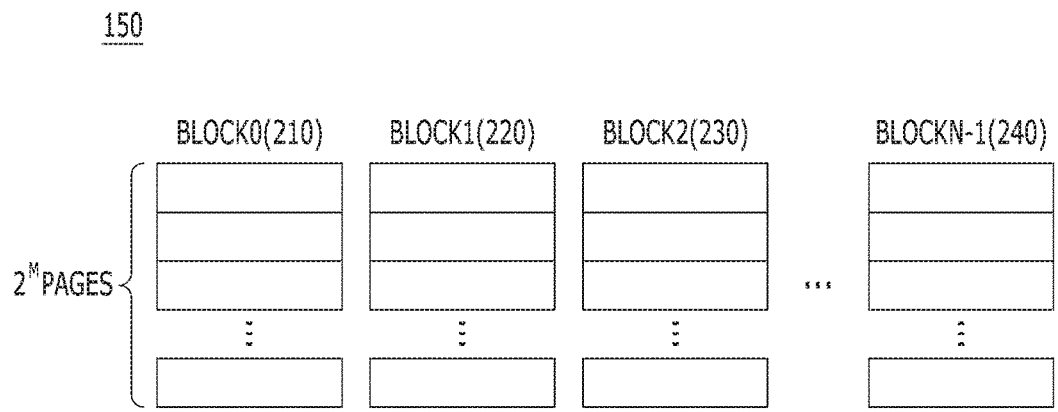
FIG. 2 is a diagram illustrating a memory device in accordance with an embodiment of the present invention.

FIG. 2 is a diagram illustrating a memory device, e.g., the memory device 150 of FIG. 1 in accordance with an embodiment of the present invention. FIG. 3 is a circuit diagram illustrating a memory cell array of a memory block in the memory device 150. FIG. 4 is a diagram illustrating a three-dimensional (3D) structure of the memory device 150.

Referring to FIG. 2, the memory device 150 may include a plurality of memory blocks 0 to N−1, e.g., a memory block 0 (BLK0) 210, a memory block 1 (BLK1) 220, a memory block 2 (BLK2) 230, and a memory block N−1 (BLKN−1) 240. Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a plurality of word lines WL.

The memory device 150 may include a plurality of memory blocks, which may include a single level cell (SLC) memory block storing 1-bit data and/or a multi-level cell (MLC) memory block storing 2-bit data. The SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include MLC memory blocks, each of which includes a plurality of pages that are realized by memory cells capable of storing two-bit data in one memory cell, but also other memory blocks with memory cells that each store more than two bits. For example, the memory device 150 may include triple level cell (TLC) memory blocks, each of which includes a plurality of pages that are realized by memory cells capable of storing three-bit data in one memory cell, quadruple level cell (QLC) memory blocks, each of which includes a plurality of pages that are realized by memory cells capable of storing four-bit data in one memory cell, and/or multiple level cell memory blocks, each of which includes a plurality of pages that are realized by memory cells capable of storing five or more-bit data in one memory cell.

In accordance with an embodiment of the present invention, the memory device 150 is described as a non-volatile memory, such as a flash memory, e.g., a NAND flash memory. However, the memory device 150 may be realized as any of a phase change random access memory (PCRAM), a resistive random access memory (RRAM or ReRAM), a ferroelectric random access memory (FRAM), a spin transfer torque magnetic random access memory (STT-RAM or STT-MRAM).

The memory blocks 210, 220, 230 and 240 may store the data transferred from the host 102 through a program operation, and transfer data stored therein to the host 102 through a read operation.

Figure 3:
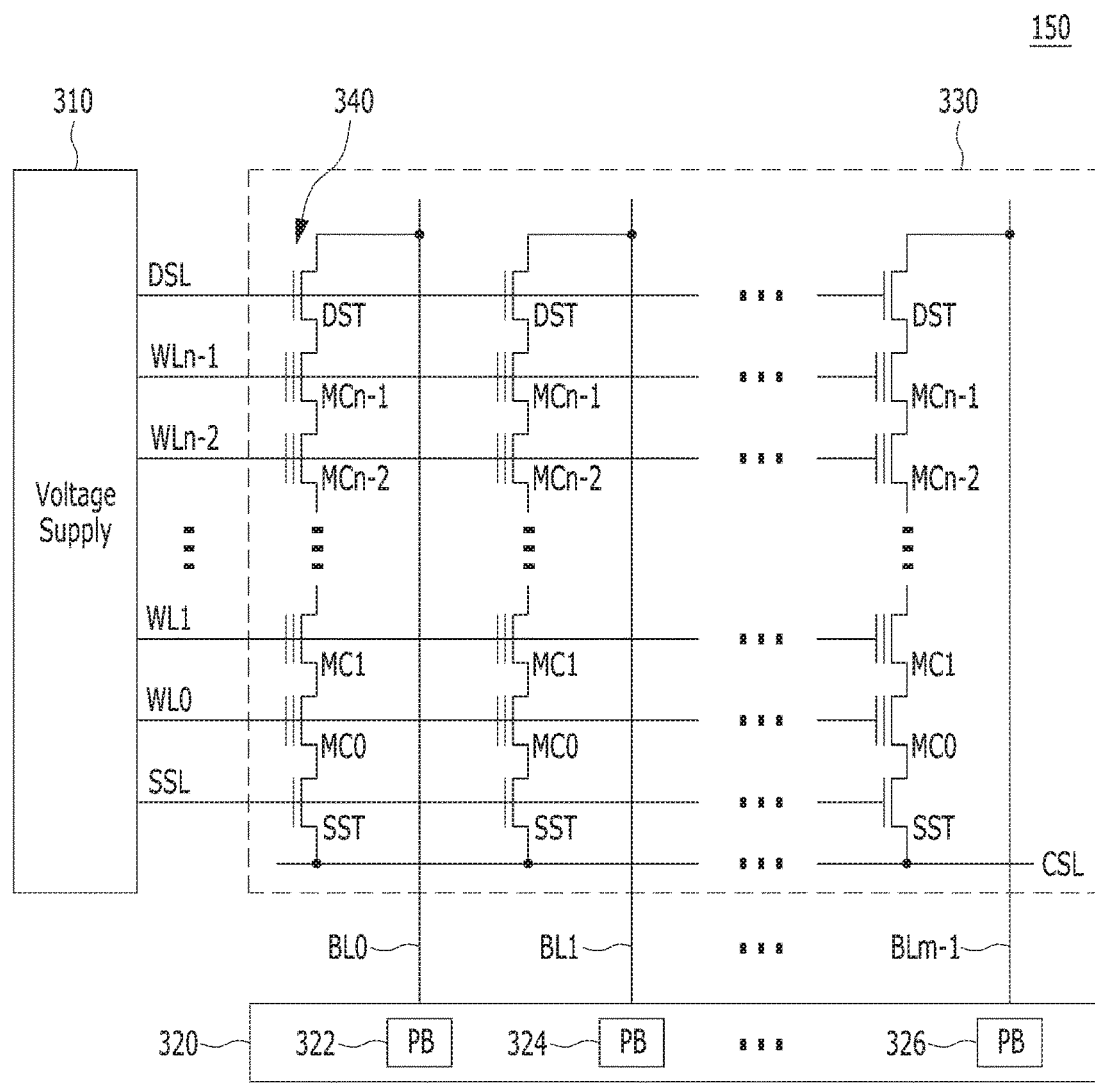
FIG. 3 is a circuit diagram illustrating a memory cell array of a memory block in a memory device in accordance with an embodiment of the present invention.
Figure 4:
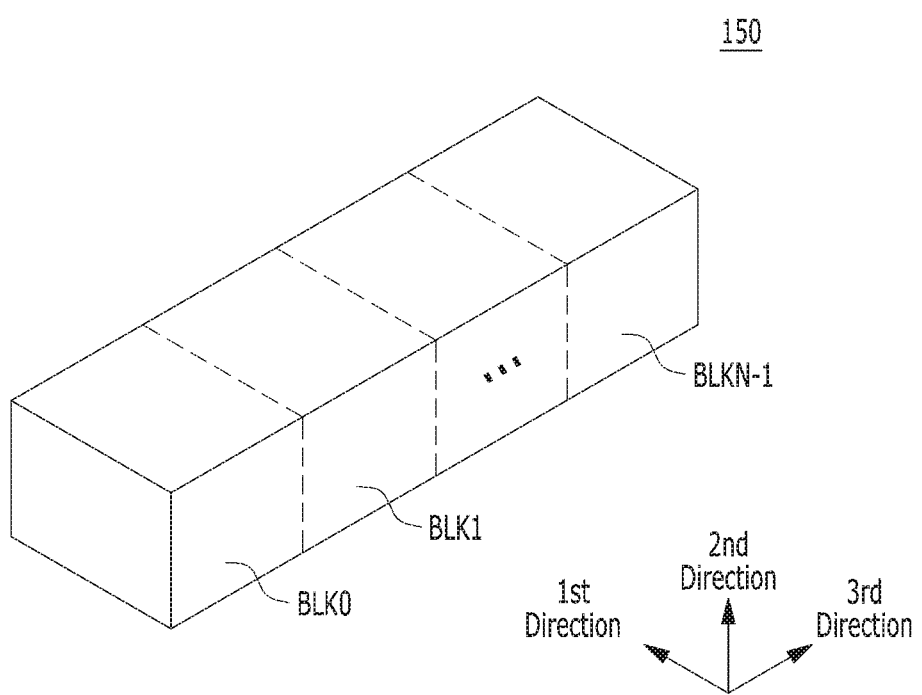
FIG. 4 is a diagram illustrating a three-dimensional (3D) structure of a memory device in accordance with an embodiment of the present invention.

Referring to FIG. 3, a memory block 330 may correspond to any of the plurality of memory blocks 152 to 156 included in the memory device 150 of the memory system 110. The memory block 330 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310, which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers (PBs) 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1. FIG. 4 illustrates the memory blocks 152 to 156 of the memory device 150 shown in FIG. 1. Each of the memory blocks 152 to 156 may be realized in a 3D structure (or vertical structure). For example, the memory blocks 152 to 156 may be a three-dimensional structure with dimensions extending in first to third directions, e.g., an x-axis direction, a y-axis direction, and a z-axis direction.

Each memory block included in the memory device 150 may include a plurality of NAND strings NS that are extended in the second direction, and a plurality of NAND strings NS that are extended in the first direction and the third direction. Each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block, among the memory blocks 152 to 156 of the memory device 150, may be coupled to a plurality of bit lines BL, a plurality of string selection lines SSL, a plurality of ground selection lines GSL, a plurality of word lines WL, a plurality of dummy word lines DWL, and a plurality of common source lines CSL. Each memory block 330 may include a plurality of NAND strings NS. In each memory block, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Memory cells MC may be provided between the string selection transistor SST and the ground selection transistor GST of each NAND string NS. In other words, a plurality of memory cells may be realized in each memory block of the memory blocks 152 to 156 of the memory device 150. A data processing operation with respect to a memory device, particularly, a data processing operation performed when a plurality of command operations corresponding to a plurality of commands are performed, in a memory system in accordance with an embodiment of the present invention is described in detail with reference to FIGS. 5 to 8.

Figure 5:
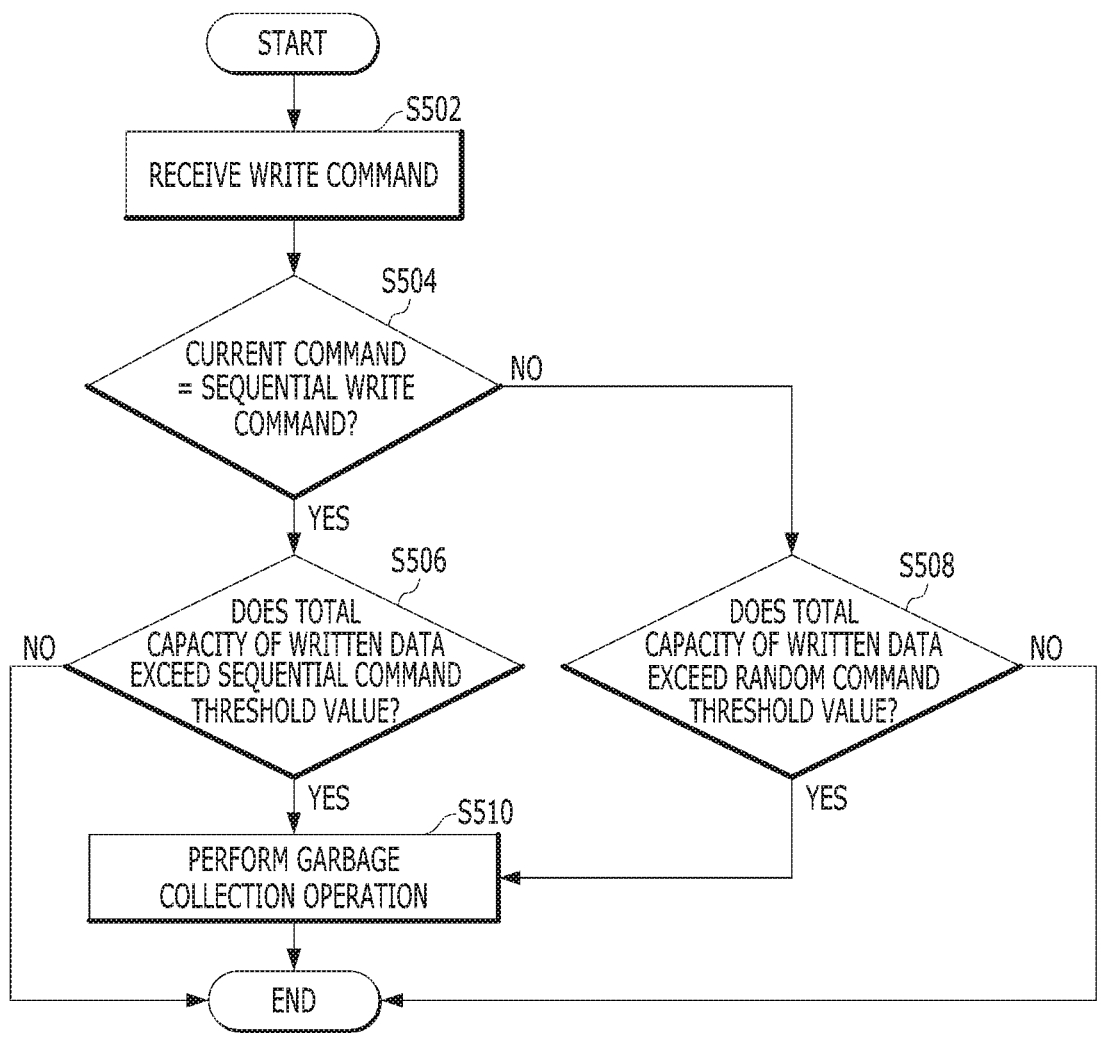
FIG. 5 is a flowchart illustrating an operation of a memory system.

FIG. 5 is a flowchart illustrating an operation of the memory system 110.

Generally, a nonvolatile memory device does not support an overwrite operation. Accordingly, when data stored in a page of the memory device 150 is updated, the memory device 150 invalidates the page in which existing data is stored, and writes the data to be updated to a new page. In order to prevent efficiency of the memory system 110 from deteriorating due to an increase in the invalidated page, the controller 130 may perform a garbage collection operation as a background operation.

Specifically, the garbage collection operation includes a series of processes of selecting a memory block including an invalid page as a victim block, copying valid data stored in the victim block onto an empty page of a target block, and erasing the data of the victim block to generate a free block.

The garbage collection operation may be performed based on whether or not a total capacity of data that is written to the memory device 150 after a preceding garbage collection operation exceeds a threshold value.

When a random write operation is performed with frequency, valid pages may be distributed due to fragmentation of data, and necessity of the garbage collection operation may increase. Therefore, when a command received by the controller 130 is a random write command, the controller 130 may control the memory device 150 to perform the garbage collection operation even when a small capacity of data is written after the preceding garbage collection operation.

In other words, the controller 130 may set a threshold value of the garbage collection operation related to the random write command to be less than a threshold value of the garbage collection operation related to a sequential write command. In various embodiments of the present invention below, the threshold value of the garbage collection operation related to the random write command may be defined as a random command threshold value, and the threshold value of the garbage collection operation related to the sequential write command may be defined as a sequential command threshold value. For example, the controller 130 may set the sequential command threshold value to 100 MB and the random command threshold value to 10 MB.

FIG. 5 is a flowchart illustrating an example of an operation of the memory system 110 of FIG. 1.

Referring to FIG. 5, at step S502, the controller 130 may receive a command from the host 102.

At step S504, the controller 130 may determine whether or not the command received currently from the host 102 is a sequential write command.

When it is determined that the command received currently is the sequential write command ("YES" at step S504), the controller 130 may determine whether or not a total capacity of data written after the preceding garbage collection operation exceeds the sequential command threshold value at step S506.

When it is determined that the total capacity of the data written exceeds the sequential command threshold value ("YES" at step S506), the controller 130 may perform the garbage collection operation at step S510.

When it is determined that the total capacity of the data written does not exceed the sequential command threshold value ("NO" at step S506), the controller 130 may complete a corresponding operation.

For example, a plurality of write commands may be provided after the preceding garbage collection operation, resulting in total 50 MB data being written. When the write command provided currently is the sequential write command for 10 MB data, it may be determined that the total capacity of the data written does not exceed the sequential command threshold value of 100 MB. Accordingly, the controller 130 may complete the corresponding operation without performing the garbage collection operation.

When it is determined that the command received currently is the random write command (that is, "NO" at step S504), the controller 130 may determine whether or not the total capacity of the data written after the preceding garbage collection operation exceeds the random command threshold value at step S508.

When it is determined that the total capacity of the data written exceeds the random command threshold value ("YES" at step S508), the controller 130 may perform the garbage collection operation at step S510.

When it is determined that the total capacity of the data written does not exceed the random command threshold value ("NO" at step S508), the controller 130 may complete the corresponding operation.

As described above, when it is determined whether or not the garbage collection operation is performed based on only the total capacity of data written after the preceding garbage collection operation and the command received currently, the garbage collection operation may be performed immediately even though a single random write command is provided while a sequential command is continuously provided.

In the above example, only the sequential command may be continuously provided as a plurality of write commands after the preceding garbage collection operation so that the total 50 MB data may be written.

However, when a single random write command is subsequently provided, the controller 130 carries out the step S508 because the current command is the random write command as a result of the determination at step S504.

At step S508, the controller 130 may determine that the total capacity of the data written exceeds the random command threshold value of 10 MB. Accordingly, at step S510, the garbage collection operation may be performed.

When the random write command is temporarily provided during successive operations, the garbage collection operation may be unnecessarily performed by the temporary random write command, whereby performance of the memory system 110 may deteriorate.

There may be various cases where the random write command is provided while the sequential write command is continuously provided. For example, even when the host 102 provides a command according to a continuous workload, a command related to a file system data may be temporarily provided. In addition, even when the host 102 continues to provide the sequential write command, the sequential write commands are rearranged in a command queue, and continuity of an address of a write operation deteriorates, whereby it may be determined that the write command provided currently is the random write command.

In order to solve such a concern, according to an embodiment of the present invention, even though the random write command is temporarily provided while the sequential write command is continuously provided, the performance of the memory system 110 may be improved by preventing the garbage collection operation from being unnecessarily performed as a result of the temporary random write command.

Figure 6:
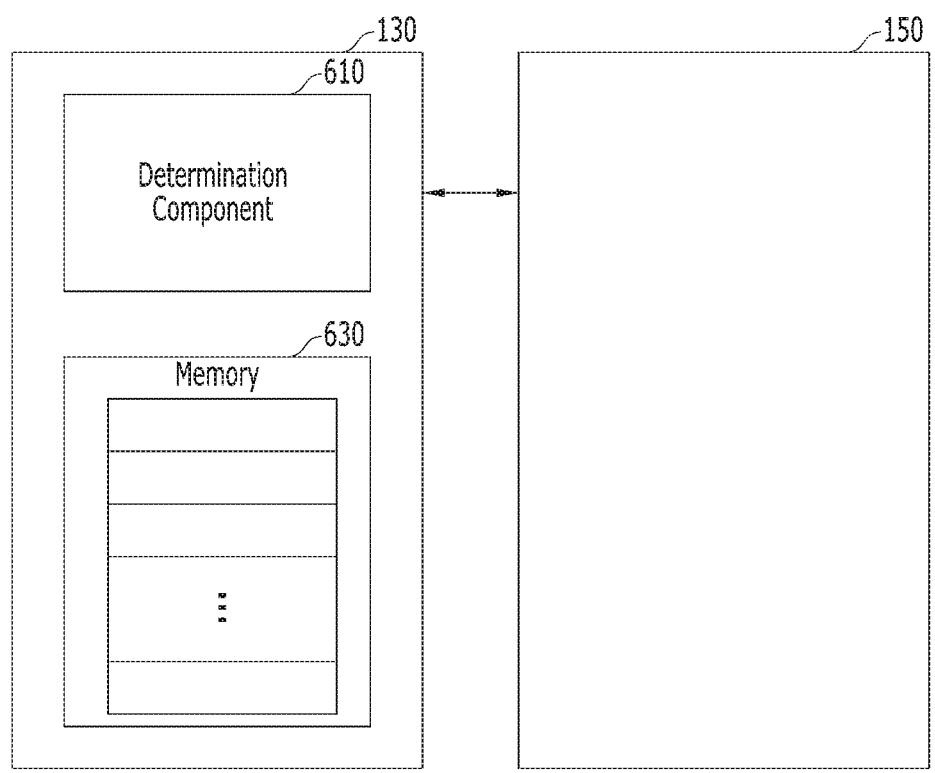
FIG. 6 is a block diagram illustrating a memory system in accordance with an embodiment of the present invention.

FIG. 6 is a block diagram illustrating a memory system 110 in accordance with an embodiment of the present invention.

Referring to FIG. 6, the memory system 110 may include a controller 130 and a memory device 150. The controller 130 may include a determination component 610, and a memory 630. The determination component 610 may be implemented with hardware, software, firmware, or combination thereof suitable for performing the processing described herein. In an embodiment, the determination component is implemented with the processor 134 shown in FIG. 1.

The determination component 610 may determine whether to perform the garbage collection operation based on whether a write command received is a sequential write command or a random write command and based on whether or not a total capacity of data written exceeds a threshold value. In addition, the determination component 610 may determine whether or not the number of sequential write commands among a set number of currently-provided commands is greater than or equal to a predetermined number, which is to be described below.

The memory 630 may store a result of the determination of whether the write command received is a sequential write command or a random write command.

According to an embodiment of the present invention, the determination component 610 may correspond to the processor 134 described above with reference to FIG. 1, and the memory 630 may correspond to the memory 144 described above with reference to FIG. 1.

Figure 7:
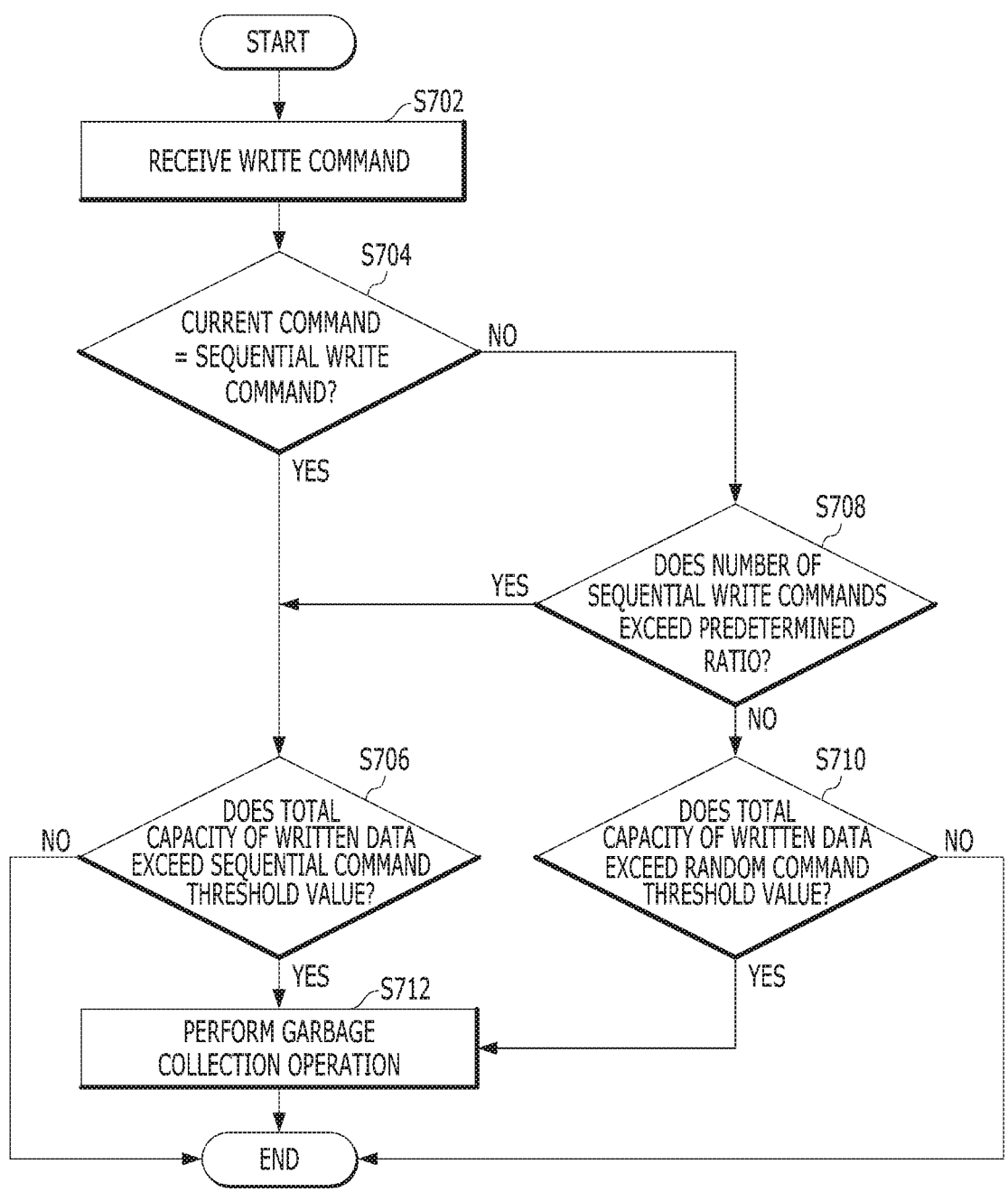
FIG. 7 is a flowchart illustrating an operation of a memory system in accordance with an embodiment of the present invention.

FIG. 7 is a flowchart illustrating an operation of a memory system in accordance with an embodiment of the present invention, for example, the memory system 110 of FIG. 6.

Figure 8A:
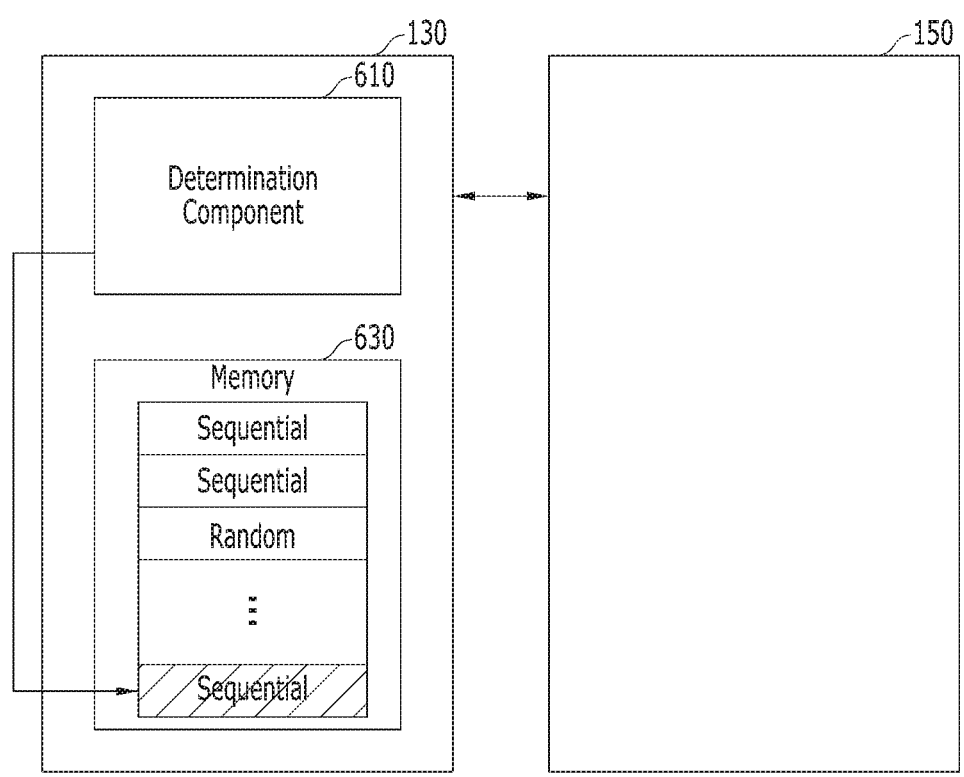
FIGS. 8A to 8C are block diagrams illustrating a memory system in accordance with an embodiment of the present invention.
Figure 8B:
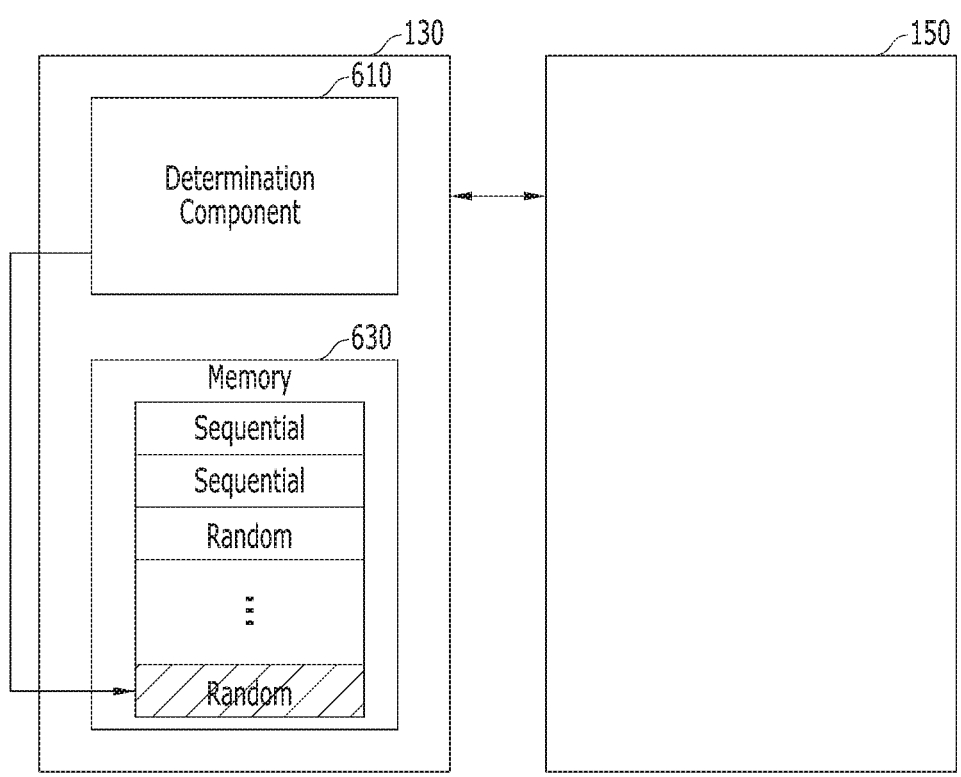
Figure 8C:
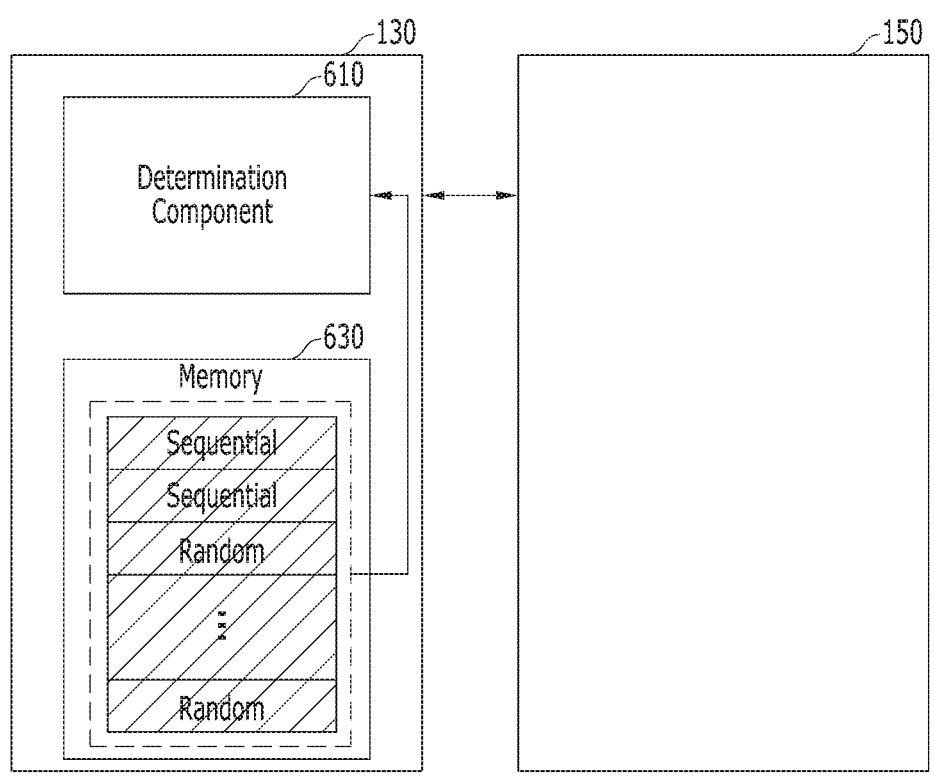

FIGS. 8A to 8C are block diagrams illustrating a memory system in accordance with an embodiment of the present invention, for example, the memory system 110 of FIG. 6.

Referring to FIG. 7, at step S702, the controller 130 may receive a write command from a host 102.

The controller 130 may receive a start address (write address) and write data together with the write command to start a write operation. For example, when the write address is '0' and a size of the write data is '5' chunk size, the controller 130 may control the memory device 150 to perform the write operation for addresses ranging from the start write address '0' to a last write address '4' which are '5' chunks of the write data. The chunk size is the size of the write data that can be written to one address.

At step S704, the determination component 610 of the controller 130 may determine whether or not the currently-provided write command is a sequential write command.

When the current write address is continuous to the last write address of the previously-performed write operation, the determination component 610 may determine that the currently-provided write command is a sequential write command. For example, when the preceding start write address is '0', the size of preceding write data is '5', the current write address is '5', and the size of the current write data is '5', the current write address may be considered to be continuous to the last write address of the previously-performed write operation, since the last address of the write operation based on the previously-provided write command is '4'. Accordingly, the determination component 610 may determine that the currently-provided write command provided is a sequential write command.

When it is determined that the currently-provided write command is a sequential write command ("YES" at step S704), the determination component 610 may store the result of the determination in the memory 630. Further, at step S706, the determination component 610 may determine whether or not the total amount or capacity of the data written to the memory device 150 after the preceding garbage collection operation exceeds a sequential command threshold value.

FIG. 8A illustrates a case where the result of the determination stored in the memory 630 indicates that the currently-provided write command is a sequential write command. The hatched "Sequential" block shown in FIG. 8A represents the result of this determination.

Referring again to FIG. 7, when the total capacity of the data written to the memory device 150 after the preceding garbage collection operation exceeds the sequential command threshold value ("YES" at step S706), the controller 130 controls the memory device 150 to perform the garbage collection operation at step S712.

When it is determined that the total capacity of the data written to the memory device 150 after the preceding garbage collection operation does not exceed the sequential command threshold value ("NO" at step S706), the controller 130 completes the corresponding operation.

When it is determined that the currently-provided write command is a random write command ("NO" at step S704), the determination component 610 may store the result of the determination in the memory 630. Then, at step S708, the determination component 610 may determine whether or not the number of sequential write commands among a set number of currently-provided commands is greater than or equal to the predetermined number. Specifically, the memory 630 may store the set number of currently-provided commands, and the determination component 610 may determine whether the number of sequential write commands is greater than or equal to the predetermined number with reference to the results of the determination of the step S704 stored in the memory unit 630.

FIG. 8B illustrates a case where the result of the determination (made at S704) stored in the memory 630 indicates that the currently-provided write command is a random write command.

The hatched "Sequential" block shown in FIG. 8B represents the result of this determination.

FIG. 8C illustrates a case where the determination component 610 performs the determination at the step S708 with reference to the results of the determinations stored in the memory 630.

Hatched lines in the box defined by dashed lines shown in FIG. 8C represents the set number in connection with this determination.

For example, the memory 630 may store the results of the determination of the step S704 for 100 currently-provided commands. That is, memory 630 may store an indication of the type (sequential write or random write) of each of the 100 currently-provided commands. When the predetermined number is approximately 90, the determination component 610 may determine whether or not the number of sequential write commands among the 100 currently-provided commands is greater than or equal to 90 with reference to the stored results of the 100 commands.

Referring again to FIG. 7, when it is determined that the number of sequential write commands among the set number of currently-provided commands is less than the predetermined number ("NO" at step S708), the determination component 610 may determine whether or not the total capacity of the data written to the memory device 150 after the preceding garbage collection operation exceeds the random command threshold value at step S710.

When it is determined that the total capacity of the data written to the memory device 150 after the preceding garbage collection operation exceeds the random command threshold value ("YES" at step S710), the controller 130 controls the memory device 150 to perform the garbage collection operation at step S712.

When it is determined that the total capacity of the data written to the memory device 150 after the preceding garbage collection operation does not exceed the random command threshold value ("NO" at step S710), the controller 130 completes the corresponding operation.

When it is determined that the number of sequential write commands among the set number of currently-provided commands is greater than or equal to the predetermined number ("YES" at step S708), the determination component 610 may determine at step S706 whether or not the total capacity of the data written to the memory device 150 after the preceding garbage collection operation exceeds the sequential command threshold value, even though the currently-provided write command is a random write command. Accordingly, only when it is determined at step S706 that the total capacity of the data written to the memory device 150 exceeds the sequential command threshold value, the garbage collection operation may be performed at step S712.

In other words, even though the random write command is temporarily generated during successive operations, the garbage collection operation may not be unnecessarily performed by the temporary random write command.

Accordingly, in accordance with embodiments of the present invention, the performance of the memory system 110 may be improved as the garbage collection operation is prevented from being unnecessarily performed.

As described above, at steps S706 and S710, the determination component 610 may determine whether or not the total capacity of the data written to the memory device 150 after the preceding garbage collection operation exceeds the sequential command threshold value and the random command threshold value.

In accordance with embodiments of the present invention, the determination component 610 may determine whether or not the total number of commands provided after the preceding garbage collection operation exceeds threshold values at steps S706 and S710.

A data processing system and electronic devices which may be formed with the memory system 110 including the memory device 150 and the controller 130, described above with reference to FIGS. 1 to 8, are described in detail below with reference to FIGS. 9 to 17.

Figure 9:
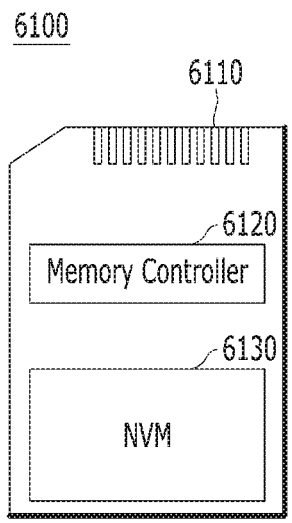
FIGS. 9 to 17 are diagrams illustrating exemplary applications of a data processing system in accordance with various embodiments of the present invention.

FIG. 9 is a diagram illustrating a data processing system including the memory system in accordance with an embodiment. FIG. 9 illustrates a memory card system 6100 to which the memory system may be applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices or particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be so integrated to form a solid state drive (SSD). Also, the memory controller 6120 and the memory device 6130 may form a memory card such as a personal computer (PC) card (personal computer memory card international association (PCMCIA)), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

Figure 10:
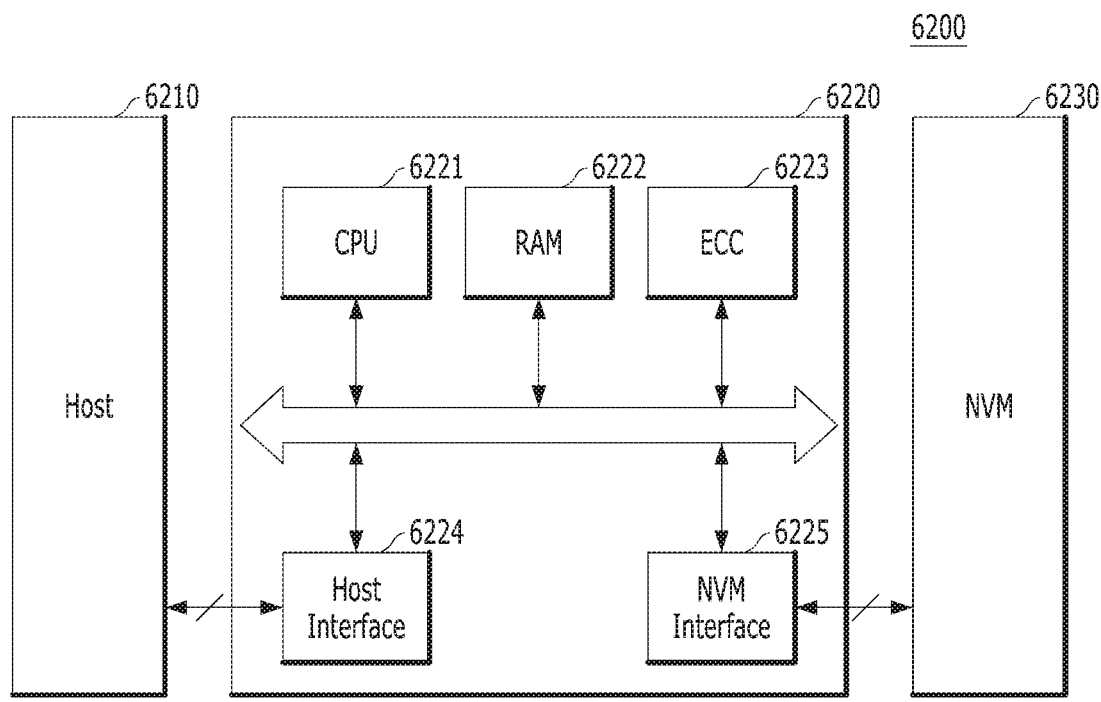

FIG. 10 is a diagram illustrating a data processing system 6200 including the memory system in accordance with an embodiment.

Referring to FIG. 10, the data processing system 6200 may include a memory device 6230 having one or more nonvolatile memories (NVM) and a memory controller 6220 for controlling the memory device 6230. The data processing system 6200 illustrated in FIG. 10 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using low density parity check (LDPC) code, Bose-Chaudhri-Hocquenghem (BCH) code, turbo code, Reed-Solomon code, convolution code, recursive systematic code (RSC) or coded modulation such as Trellis-coded modulation (TCM) or block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through a parallel advanced technology attachment (PATA) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system may be applied to wired and/or wireless electronic devices, particularly a mobile electronic device.

Figure 11:
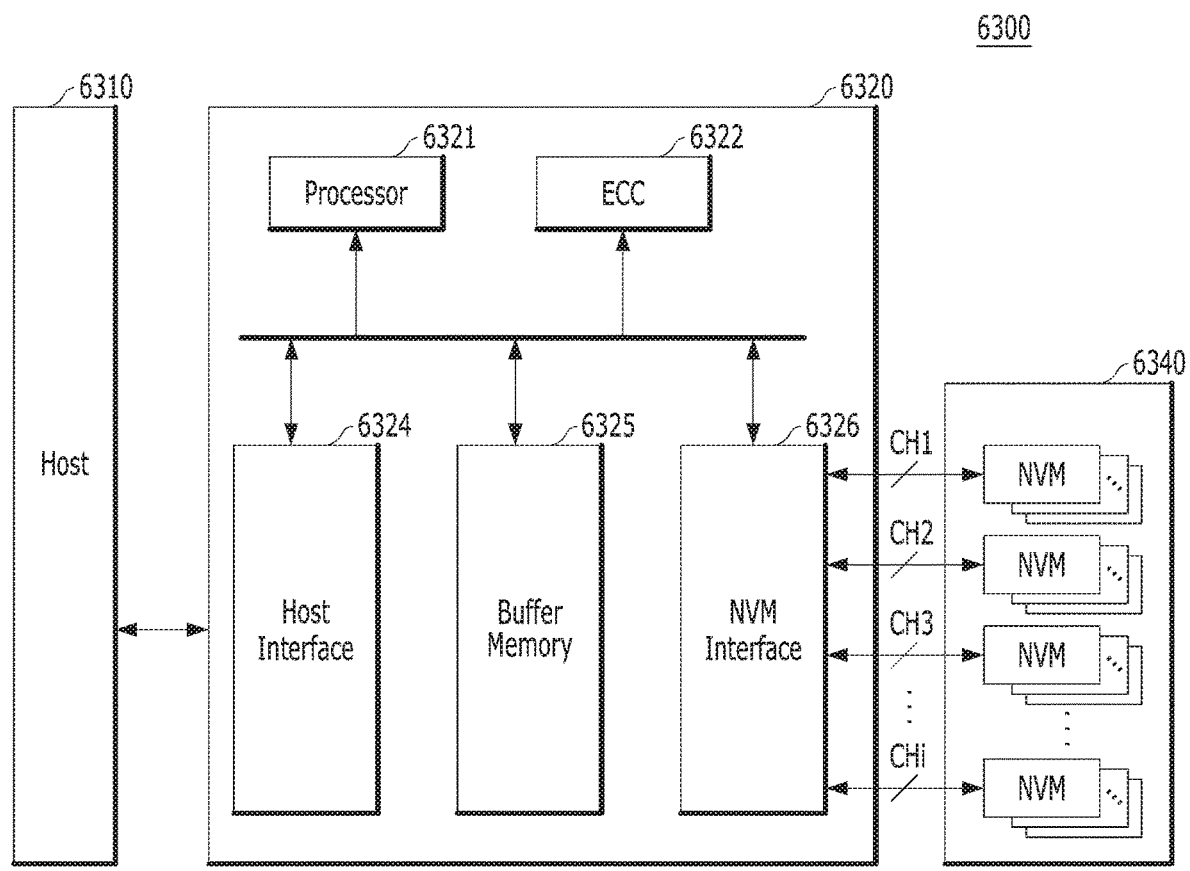

FIG. 11 is a diagram illustrating a data processing system including the memory system in accordance with an embodiment. FIG. 11 illustrates a solid state drive (SSD) 6300 to which the memory system may be applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an error correction code (ECC) circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). By way of example, FIG. 11 illustrates that the buffer memory 6325 is disposed in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
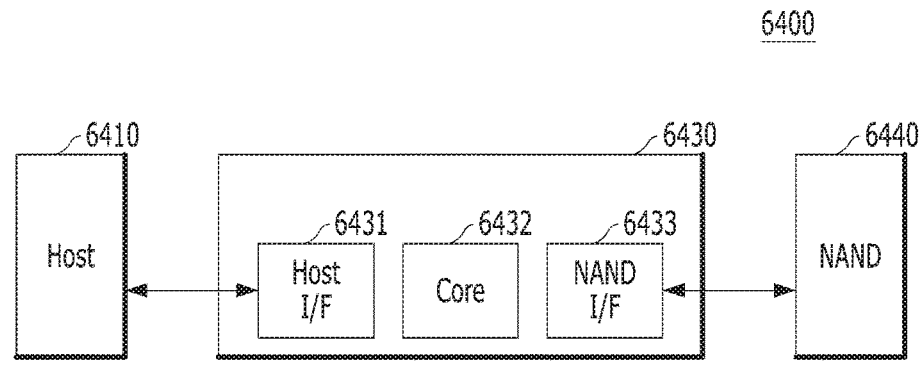

FIG. 12 is a diagram illustrating a data processing system including the memory system in accordance with an embodiment. FIG. 12 illustrates an embedded multi-media card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I or UHS-II interface.

FIGS. 13 to 16 are diagrams illustrating examples of a data processing system including the memory system in accordance with one or more embodiments. FIGS. 13 to 16 illustrate universal flash storage (UFS) systems to which the memory system may be applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices. The UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices, through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY or MIPI unified protocol (UniPro) in mobile industry processor interface (MIPI). Furthermore, the UFS devices 6520, 6620, 6720 and 6820 and the UFS cards 6530, 6630, 6730 and 6830 may communicate with each other through any of various protocols other than the UFS protocol, for example, universal storage bus (USB) Flash Drives (UFDs), multi-media card (MMC), secure digital (SD), mini-SD, and micro-SD.

Figure 13:
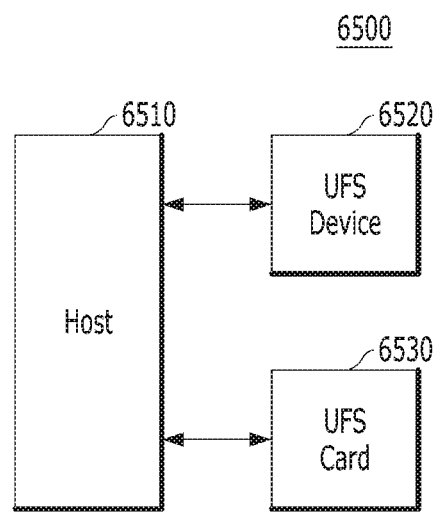

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In FIG. 13, the configuration in which one UFS device 6520 and one UFS card 6530 are connected to the host 6510 is illustrated for clarity. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
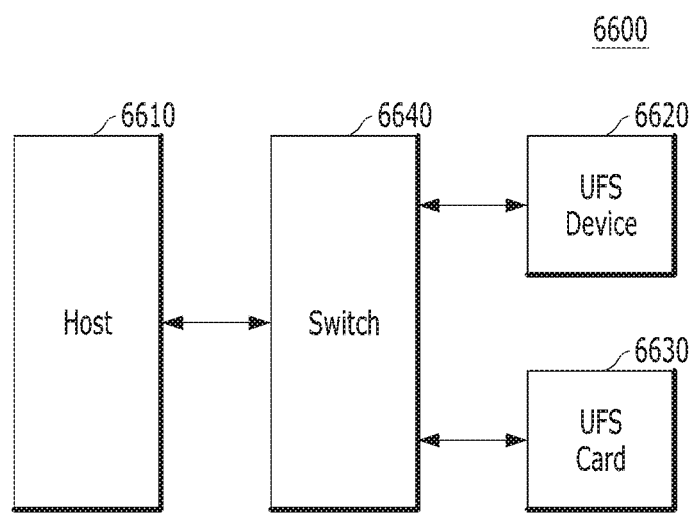

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In FIG. 14, the configuration in which one UFS device 6620 and one UFS card 6630 are connected to the switching module 6640 is illustrated for clarity. However, a plurality of UFS devices and UFS cards may be connected in parallel or in the form of a star to the switching module 6640, and a plurality of UFS cards may be connected in series or in the form of a chain to the UFS device 6620.

Figure 15:
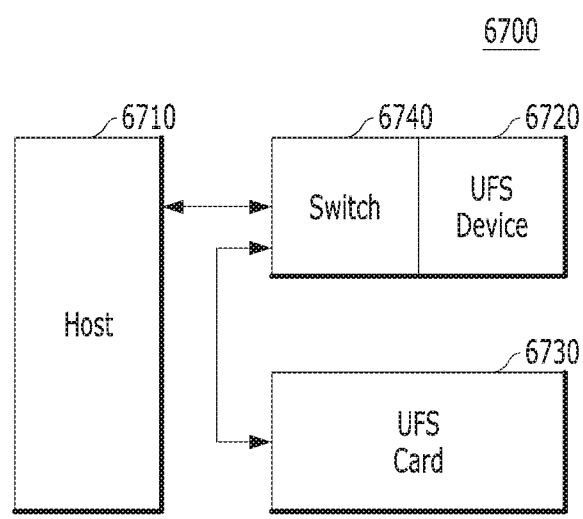

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In FIG. 15, the configuration in which one UFS device 6720 and one UFS card 6730 are connected to the switching module 6740 is illustrated for clarity. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
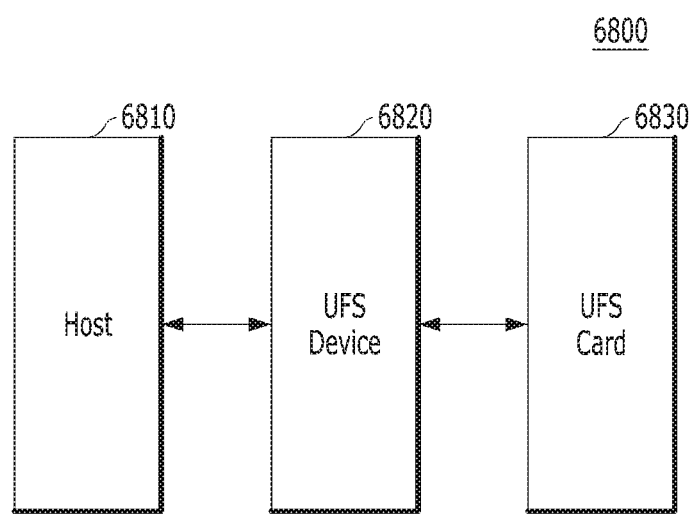

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In FIG. 16, the configuration in which one UFS device 6820 is connected to the host 6810 and one UFS card 6830 is connected to the UFS device 6820 is illustrated for clarity. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
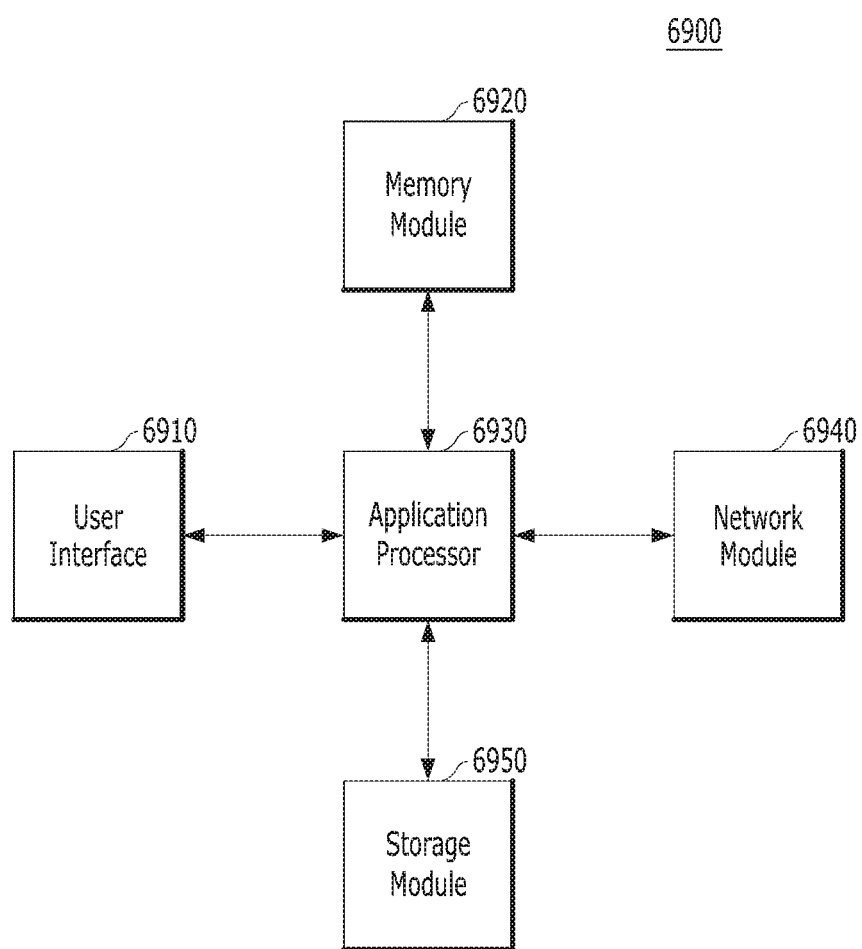

FIG. 17 is a diagram illustrating a data processing system including the memory system in accordance with an embodiment. FIG. 17 is a diagram illustrating a user system 6900 to which the memory system may be applied.

Referring to FIG. 17, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. An operating method of a memory system, comprising:
   determining whether a write command currently provided is a sequential write command or a random write command based on an address of the write command currently provided; and
   performing a garbage collection operation when an amount of data provided after a preceding garbage collection operation exceeds a first or second threshold,
   wherein the memory system determines the threshold as the first threshold when the write command currently provided is a sequential write command, determines the threshold as the first threshold when the write command currently provided is a random write command and most of the commands among a set number of recently-provided commands are sequential write commands, and determines the threshold as the second threshold, which is smaller than the first threshold, when the write command currently provided is a random write command and sequential write commands are not a most part of the commands among the set number of recently-provided commands.

2. The operating method of claim 1, further comprising:
   storing a result obtained by determining whether the write command currently provided is a sequential write command or a random write command.

3. The operating method of claim 1, wherein the performing of the garbage collection operation includes:
   selecting a memory block including an invalid page as a victim block;
   copying valid data stored in the victim block into an empty page of a target block; and
   erasing the data of the victim block to generate a free block.

4. A memory system, comprising:
   a memory device suitable for storing data; and
   a controller suitable for controlling the memory device,
   wherein the controller determines whether a write command currently provided is a sequential write command or a random write command based on an address of the write command currently provided; performs a garbage collection operation when an amount of data provided after a preceding garbage collection operation exceeds a first or second threshold;
   determines the threshold as the first threshold when the write command currently provided is a sequential write command; determines the threshold as the first threshold when the write command currently provided is a random write command and most of the commands among a set number of recently-provided commands are sequential write commands; and determines the threshold as the second threshold, which is smaller than the first threshold, when the write command currently provided is a random write command and sequential write commands are not a most part of the commands among the set number of recently-provided commands.

5. The memory system of claim 4, wherein the controller includes:
   a memory suitable for storing a result of the determination.

6. The memory system of claim 4, wherein the controller performs the garbage collection operation by selecting a memory block including an invalid page as a victim block, copying valid data stored in the victim block onto an empty page of a target block, and erasing the data of the victim block to generate a free block.

7. An operating method of a memory system, comprising:
   determining whether a write command currently provided is a sequential write command or a random write command based on an address of the write command currently provided; and
   performing a garbage collection operation when a number of commands provided after a preceding garbage collection operation exceeds a first or second threshold,
   wherein the memory system determines the threshold as the first threshold, when the write command currently provided is a sequential write command, determines the threshold as the first threshold when the write command currently provided is a random write command and most of the commands among a set number of recently-provided commands are sequential write commands, and determines the threshold as the second threshold, which is smaller than the first threshold, when the write command currently provided is a random write command and sequential write commands are not a most part of the commands among the set number of recently-provided commands.

8. The operating method of claim 7, further comprising:
storing a result obtained by determining whether the write command currently provided is a sequential write command or a random write command.

9. The operating method of claim 7, wherein the performing of the garbage collection operation includes:
selecting a memory block including an invalid page as a victim block;
copying valid data stored in the victim block onto an empty page of a target block; and
erasing the data of the victim block to generate a free block.

10. A memory system, comprising:
a memory device suitable for storing data; and
a controller suitable for controlling the memory device,
wherein the controller determines whether a write command currently provided is a sequential write command based on an address of the write command currently provided; performs a garbage collection operation when a number of commands provided after a preceding garbage collection operation exceeds a first or second threshold, determines the threshold as the first threshold when the write command currently provided is a sequential write command; determines the threshold as the first threshold when the write command currently provided is a random write command and most of the commands among a set number of recently-provided commands are sequential write commands; and determines the threshold as the second threshold, which is smaller than the first threshold, when the write command currently provided is a random write command and sequential write commands are not a most part of the commands among the set number of recently-provided commands.

11. The memory system of claim 10, wherein the controller includes:
a memory suitable for storing a result of the determination.

12. The memory system of claim 10, wherein the controller performs the garbage collection operation by selecting a memory block including an invalid page as a victim block, copying valid data stored in the victim block onto an empty page of a target block, and erasing the data of the victim block to generate a free block.

* * * * *